United States Patent Office 3,317,536
Patented May 2, 1967

3,317,536
4-BENZENESULFONAMIDO-PYRIMIDINE
DERIVATIVES
André Grüssner, Basel, Eckehard Lorch, Reinach, Basel-Land, and Otto Schnider, Basel, Switzerland, assignors to Hoffmann-La Roche Inc., Nutley, N.J., a corporation of New Jersey
No Drawing. Filed June 11, 1965, Ser. No. 463,344
Claims priority, application Switzerland, June 19, 1964, 8,084/64; Dec. 16, 1964, 16,252/64
38 Claims. (Cl. 260—256.5)

This invention pertains to novel sulfonamides and to processes for the preparation thereof. More specifically, the invention relates to sulfonamides of the pyrimidine series which can be represented by the formula

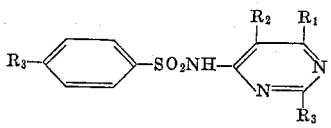

I wherein $R_1$ represents hydrogen, alkoxy-alkyloxy or hydroxy-alkyloxy, $R_2$ represents lower alkyl, cycloalkyl, lower alkenyl, cycloalkenyl, phenyl, substituted phenyl, phenyl-lower alkyl, substituted phenyl-lower alkyl, lower alkoxy, alkoxyalkyl, hydroxyalkyl, alkoxyalkyloxy or hydroxy-alkyloxy, $R_3$ represents hydrogen, lower alkyl, alkoxylalkyloxy or hydroxy-alkyloxy and $R_4$ represents hydrogen, lower alkyl, halogen, alkylthio or lower alkoxy and pharmaceutically acceptable salts of such sulfonamides.

The term "alkoxyalkyloxy" denotes a group of the formula $$-O-(CH_2)_n-O-C_nH_{2n+1}$$

wherein $n$ signifies a whole number from 1–7, preferably from 1–3.

Such alkoxyalkyloxy groups are, for example, methoxy-methyloxy, methoxyethyloxy, methoxypropyloxy, methoxy-n-butyloxy, methoxy-n-hexyloxy, ethoxymethyloxy, ethoxyethyloxy, ethoxy-n-propyloxy, ethoxy-n-butyloxy, n-hexyloxyethyloxy. The term "hydroxy-alkyloxy" indicates a group of the formula $$-O-(CH_2)_n-OH$$

wherein $n$ signifies a whole number from 1–7, especially from 1–3.

Such hydroxy-alkyloxy groups are, for example, hydroxy-methyloxy, hydroxy-ethyloxy, hydroxy-propyloxy, hydroxy-n-butyloxy, hydroxy-n-hexyloxy. The term "lower alkyl" as well as the alkyl moiety of lower alkoxy and other groups denotes a saturated aliphatic hydrocarbon having 1–7 carbon atoms which may be either straight or branched chain such as methyl, ethyl, propyl, isopropyl, n-butyl, n-hexyl and the like. An alkyl group present as the $R_3$ or $R_4$ substituent preferably contains 1–3 carbon atoms and is thus preferably a methyl, ethyl, propyl or isopropyl group. The term "lower alkenyl" represents unsaturated aliphatic groups of up to 7 carbon atoms either straight or branched such as allyl and the like. The term "lower alkoxy" denotes ether groups with 1–7 carbon atoms such as methoxy, ethoxy, n-propoxy, isopropoxy, n-butoxy or isobutoxy. The term "cyclo-alkyl" denotes saturated carbocyclic rings of 3–7 carbon atoms such as cyclopentenyl, cyclohexyl and the like. The term "cycloalkenyl" denotes olefinically unsaturated carbocyclic rings of 3–7 carbon atoms such as cyclopentenyl, cyclohexenyl and the like. The term "phenyl-lower alkyl" denotes lower alkyl groups bearing a phenyl group such as benzyl, phenethyl, etc. The terms "substituted phenyl" and "substituted phenyl-lower alkyl" denote groups in which the phenyl nucleus bears one or more of the following substituents: halogen atoms, e.g., bromine or chlorine atoms, hydroxy groups, lower alkyl and lower alkoxy groups, especially those with 1–3 carbon atoms; hydroxy-alkyl groups, especially those of the formula $$-(CH_2)_n-OH$$

wherein $n$ signifies a whole number from 1–7, such as, for example, hydroxy-methyl, hydroxy-ethyl, hydroxy-n-propyl, hydroxy-n-butyl and the like; alkoxyalkyl groups, especially those of the formula $-(CH_2)_n-O-C_nH_{2n+1}$, wherein $n$ signifies a whole number from 1–7, for example, methoxymethyl, methoxyethyl, methoxy-n-propyl, methoxy-n-butyl, methoxy-n-hexyl, ethoxymethyl, ethoxyethyl, ethoxy-n-propyl, ethoxy-n-butyl, n-hexyloxymethyl, n-hexyloxyethyl and the like. In the case where $R_2$ is substituted phenyl or substituted phenyl-lower alkyl, the para-position is the preferred point of substitution when only one substituent is present on the phenyl ring and the meta- and para-positions are preferred when two substituents are present. The term "halogen" denotes all four halogens, though the middle halogens, i.e., chlorine and bromine, are preferred. The preferred alkylthio groups are those which contain 1–7 carbon atoms such as methylthio, ethylthio, n-propylthio, isopropylthio, etc.

According to one of the process aspects of this invention, compounds of Formula I are prepared by condensing a halogenopyrimidine of the formula

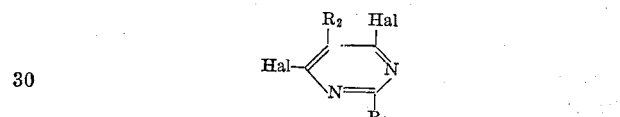

II wherein Hal signifies a halogen atom, especially a bromine or chlorine atom, and $R_2$ as well as $R_3$ have the above significance with an alkali metal salt of a benzene-sulfonic acid amide of the formula

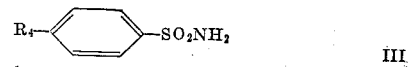

III wherein $R_4$ has the above significance thereby forming a compound of the formula

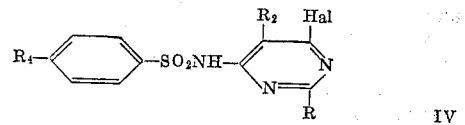

IV wherein $R_2$, $R_3$, $R_4$ and Hal have the above significance. Compounds of Formula I are obtained by replacing the 6-halogen atom with an $R_1$ substituent.

The above process is conveniently carried out by condensing the dihalogeno-pyrimidine of Formula II which is used as starting material with about 2 mole-equivalents of an alkali metal salt, e.g., the sodium or potassium salt of the sulfonamide component of Formula III in the presence of a solvent or diluent such as dimethylformamide at temperatures between about 50 and about 120° C. The 6-halogen atom of the condensation product of Formula IV which is obtained is thereupon replaced by an $R_1$ substitutent in a second step; thus, for example, by an alkoxyalkyloxy group, a hydroxy-alkyloxy group or a hydrogen atom. The replacement of the 6-halogen atom by alkoxyalkyloxy or hydroxyalkyloxy is conveniently effected by reacting the 6-halogeno compound of Formula IV with an alcoholate of an alcohol in the presence of the corresponding alcohol. Suitable alcoholates are, for example, (ethylene glycol monoethyl ether)-sodium in ethylene glycol-monoethyl ether, (ethylene glycol)-sodium in ethylene glycol, etc. The alcoholysis operation can be undertaken by heating the reaction mixture, preferably to a temperature of about 70–120° C. Higher temperatures can also be used if the reaction is carried out under pressure. The replacement of the 6-halogen atom by hydrogen can be effected by catalytic hydrogenation in the presence of noble metal catalysts such as palladium.

The dihalogeno-pyrimidines of Formula II which are used as starting materials for the process, insofar as they are not known, can be obtained according to methods which are known per se, for example, by treating a $R_2$-substituted malonic acid diamide with formamide or with $R_3$-substituted formamide in ethanol in the presence of sodium ethylate and thereafter halogenating the reaction product with a phosphoryloxy halogenide in the presence of dimethylaniline.

In another process aspect of this invention compounds of Formula I are obtained by condensing an amino-pyrimidine of the general formula

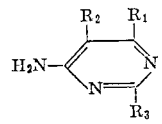

wherein $R_1$, $R_2$ and $R_3$ have the above significance with a benzene-sulfohalogenide of the formula

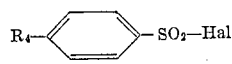

wherein $R_4$ and Hal have the above significance.

The coupling of an amino-pyrimidine of Formula V with a benzene-sulfohalogenide in accordance with the above process can be conveniently carried out in a suitable solvent such as an organic base, e.g., pyridine and the like. The condensation reaction can be suitably carried out at room temperature though higher or lower temperatures can also be used.

The amino-pyrimidines which are used as starting materials can be obtained by reacting a 4,6-dihalogeno-5-$R_2$-pyrimidine of Formula II with liquid ammonia and subjecting the 4-amino-6-halogeno-pyrimidine obtained to alcoholysis as already described above.

The compounds of Formula I may be converted into salts with inorganic or organic bases such as alkali or alkaline earth hydroxides, e.g., sodium hydroxide, potassium hydroxide, calcium hydroxide, etc., alkali carbonates, alkali bicarbonates, amimes such as methyl glucosamine, morpholine, etc., or amino alcohols such as ethanolamine. Pharmaceutically acceptable salts are prepared from pharmaceutically acceptable bases.

The compounds of Formula I are useful as medicaments. More specifically, they are useful as blood-sugar depressants. They are particularly useful because of their blood-sugar depressant activity without being antibacterially active. The compounds of this invention can be administered systemically, for example, in the form of orally administerable pharmaceutical preparations which contain them or their salts in admixture with an organic or inorganic inert carrier material suitable for enteral application such as, for example, water, gelatin, lactose, starch, magnesium stearate, talc, vegetable oils, gums, polyalkylene glycols, Vaseline, etc. The pharmaceutical preparations can be submitted in solid form, e.g., as tablets, dragees, suppositories, capsules or in liquid form, e.g., as solutions, suspensions, emulsions. They may be sterilized and/or contain additive materials such as preserving, stabilizing, wetting or emulsifying agents, salts for varying the osmotic pressure or buffers. They can also contain other thereapeutically valuable materials.

The invention will be more fully understood from the following examples which illustrate the invention but are not to be construed as limitative thereof. Melting points are in degrees centigrade.

*Example 1*

10 g. of 4-amino-5-($\beta$-methoxyethyl)-6-($\beta$-ethoxyethyloxy)-pyrimidine were treated portionwise in 30 ml. of absolute pyridine at 2–3° under stirring with 8.2 g. of p-toluene-sulfonyl chloride and stirring was continued for 32 hours at room temperature. The reaction solution was evaporated in vacuo at 50°, the residue heated at 50° for 5 minutes with dilute caustic soda, the solution decolorized with carbon, filtered and the filtrate adjusted to pH 5 with acetic acid. The oily product which separated was taken up with ether, the ether solution dried with sodium sulfate, the ether distilled off and the residue crystallized from butyl oxide. The 4-(p-toluene-sulfonamido)-5-($\beta$-methoxyethyl)-6-($\beta$-ethoxyethyloxy)-pyrimidine of melting point 79–80° was thus obtained.

The 4-amino-5-($\beta$-methoxyethyl)-6-($\beta$-ethoxyethyloxy)-pyrimidine which was used as starting material was obtained as follows:

4,6-dichloro-5-($\beta$-methoxyethyl)-pyrimidine was shaken with liquid ammonia in the autoclave at 20°. 4-amino-5-($\beta$-methoxyethyl)-6-chloro-pyrimidine of melting point 113–114° (from acetonitrile) was obtained. This compound was reacted with (ethylene glycol monoethyl ether)-sodium at 100°. The so-obtained 4-amino-5-($\beta$-methoxyethyl)-6-($\beta$-ethoxyethyloxy)-pyrimidine when crystallized from butyl oxide melted at 66–67°.

*Example 2*

By a procedure analogous to that described in Example 1 above, there was prepared 4-(4'-chloro-benzenesulfonamido)-5-($\beta$-methoxyethyl)-6-($\beta$-ethoxyethyloxy)-pyrimidine from 25.5 g. of 4-amino-5-($\beta$-methoxyethyl)-6-($\beta$-ethoxyethyloxy)-pyrimidine and 21 g. of p-chloro-benzene-sulfonyl chloride in 100 ml. of absolute pyridine. Recrystallized from isopropyl ether, the product melted at 68–69°.

As an exemplary pharmaceutical formulation the above product can be compounded into a tablet as follows:

| | Mg. |
|---|---|
| 4-(4'-chloro-benzene-sulfonamido)-5-($\beta$-methoxyethyl)-6-($\beta$-ethoxyethyloxy)-pyrimidine | 500.00 |
| Lactose | 90.00 |
| Maize starch | 125.60 |
| Magnesium stearate | 1.44 |
| Talc | 12.96 |
| Tablet weight | 730.00 |

*Example 3*

11.25 g. of 4,6-dichloro-5-phenyl-pyrimidine were heated with 23 g. of (p-toluene-sulfonamide)-sodium for 5 hours at 95° in 80 ml. of dimethylformamide. After evaporation of the solution in vacuo, the residue was dissolved in water and adjusted to pH 6.8. The excess of p-toluene-sulfonamide which crystallized out was filtered off by suction and the solution was adjusted to pH 5 with acetic acid. The 4-(p-toluene-sulfonamido)-5-phenyl-6-chloro-pyrimidine which crystallized out melted at 194–195°. This compound was heated at 100° with (ethylene glycol monoethyl ether)-sodium in ethylene glycol monoethyl ether. There was thus obtained 4-(p-toluene-sulfonamido)-5-phenyl-6-($\beta$-ethoxyethyloxy)-pyrimidine which, when recrystallized from isopropyl ether, melted at 134–136°.

*Example 4*

16 g. of 4-amino-5-phenyl-6-($\beta$-ethoxyethyloxy)-pyrimidine were heated for 16 hours at 100° with 50 g. of p-chloro-benzene sulfochloride in absolute pyridine. After evaporation of the pyridine in vacuo, the residue was treated at 60–70° for 6 hours with 3 N caustic soda. The solution was filtered with carbon and acidified. There was thus obtained 4-(4'-chloro-benzenesulfonamido)-5-phenyl-6-($\beta$-ethoxyethyloxy)-pyrimidine which crystallized from acetonitrile and melted at 138–140°. Melting point of the sodium salt (containing 1 mole of $H_2O$):139–141°.

The 4-amino-5-phenyl-6-($\beta$-ethoxyethyloxy)-pyrimidine which was used as the starting material was obtained as follows:

4,6-dichloro-5-phenyl-pyrimidine was shaken with liquid ammonia in the autoclave at 40°. After evaporation of the ammonia, the residue was digested with water and the solid 4-amino-5-phenyl-6-chloro-pyrimidine was filtered off by suction. The product, after crystallizing from acetonitrile, melted at 194–195°. The 4-amino-5-phenyl-6-(β-ethoxyethyloxy)-pyrimidine of melting point 103–104° was prepared from this compound by heating with sodium in ethylene glycol monoethyl ether.

Example 5

By reacting 54 g. of 4.6-dichloro-5-phenyl-pyrimidine with 86 g. of (benzene-sulfonamide)-sodium in 300 ml. of dimethylformamide in a manner analogous to that of Example 3, there was obtained 4-benzenesulfonamido-5-phenyl-6-chloro-pyrimidine of melting point 207–208°. This compound was heated at 100° with (ethylene glycol monoethyl ether)-sodium in ethyleneglycol monoethyl ether. There was thus obtained 4-benzenesulfonamido-5-phenyl - 6 - (β-ethoxyethyloxy) - pyrimidine which, when crystallized from ethonal, had a melting point of 134–135°. Under analogous conditions, with (ethylene glycol monomethyl ether)-sodium in ethyleneglycol monomethyl ether, there was obtained 4-benzenesulfonamido-5-phenyl-6-(β-methoxyethyloxy)-pyrimidine which, upon crystallizing from ethanol, melted at 126–128° and with (ethylene glycol)-sodium in ethylene glycol there was obtained 4-benzenesulfonamido-5-phenyl- 6- (β-hydroxyethyloxy)-pyrimidine which, after crystallizing from acetonitrile, melted at 164–166°.

Example 6

By a procedure analogous to that of Example 5, there was prepared from 22.5 g. of 4,6-dichloro-5-phenyl-pyrimidine and 50 g. of (p-chloro-benzenesulfonamide)-sodium in 160 ml. of dimethylformamide the compound 4-(4'-chloro-benzenesulfonamido) - 5 - phenyl-6 - chloro-pyrimidine which, after crystallizing from acetonitrile, melted at 208–209°. From this compound there was obtained with ethylene glycol monomethyl ether and sodium by the procedure of the preceding example 4-(4'-chloro-benzenesulfonamido)-5 - phenyl-6-(β-methoxyethyloxy)-pyrimidine which, when crystallized from ethanol melted at 139–141°. With ethylene glycol and sodium there was obtained 4-(4'-chloro-benzenesulfonamido)-5-phenyl-6 - (β-hydroxyethyloxy)-pyrimidine which, when crystallized from acetonitrile, melted at 189–191°. Melting point of the sodium salt: >300°.

Example 7

By a procedure analogous to that of Example 5, 49.7 g. of 4.6-dichloro-5-(β-methoxyethyl)-pyrimidine was reacted with 86 g. of (benzene-sulfonamide)-sodium in 380 ml. of dimethylformamide. The 4-benzenesulfonamido-5-(β - methoxyethyl) - 6-chloro-pyrimidine thus obtained had a melting point of 124–125°. This compound was then reacted with ethylene glycol monomethyl ether and sodium to give 4-benzenesulfonamido-5-(β-methoxyethyl)-6-(β-methoxyethyloxy)-pyrimidine which, when crystallized from acetonitrile/ether, melted at 79–82°. With ethylene glycol monoethyl ether and sodium there was obtained 4-benzenesulfonamido-5 - (β-methtoxyethyl) - 6- (β-ethoxyethyloxy)-pyrimidine which, when crystallized from ethanol, had a melting point of 92–93°.

Example 8

20.7 g. of 4,6-dichloro-5-(β-methoxyethyl)-pyrimidine was reacted with 50 g. of (p-chloro-benzenesulfonamide)-sodium in 160 ml. of dimethylformamide by the procedure of Example 6 to give 4-(4'-chloro-benzenesulfonamido)-5 - (β-methoxyethyl) - 6 - chloro-pyrimidine which, when crystallized from isopropyl ether melted at 103–104°. This compound was reacted with ethylene glycol and sodium to give 4 - (4'-chloro-benzenesulfonamido)-5 - (β-methoxyethyl)-6-(β-hydroxyethyloxy)-pyrimidine. From the uncrystallized oil there was prepared the Ca salt which, when crystallized from acetonitrile, had a melting point of 303–305° and the dicyclohexyl amine salt which crystallized from acetonitrile had a melting point of 132°.

Example 9

18 g. of 4.6-dichloro-5-(β-methoxyethyloxy)-pyrimidine and 24 g. of (benzene-sulfonamide)-sodium was heated in 180 ml. of dimethylformamide in a manner analogous to that of Example 3. The 4-benzenesulfonamido-5-β-methoxyethyloxy) - 6 - chloro-pyrimidine which was obtained melted at 89–90° when crystallized from ehtanol. From this compound by heating with ethylene glycol and sodium, there was obtained 4-benzenesulfonamido-5-(β-methoxyethyloxy) - 6 - (β-hydroxyethyloxy) - pyrimidine which, when crystallized from ethanol, melted at 129°.

4-benzenesulfonamido-5 - (β - methoxyethyloxy) - pyrimidine was obtained by hydrogenating 6.8 g. of 4-benzenesulfonamido-5 - (β-methoxyethyloxy)-6 - chloro - pyrimidine in a solution of 2 g. of sodium hydroxide in 200 ml. of methanol with 5 g. of Pa-C (5 percent Pa) as catalsyt. The product, when crystallized from acetonitrile, melted at 194–195°.

Example 10

By a procedure analogous to that of Example 5, 18 g. of 4,6-dichloro-5-(β-methoxyethyloxy)-pyrimidine was reacted with 29.4 g. of (p-chloro-benzenesulfonamide)-sodium in 180 ml. of dimethylformamide to give 4-(4'-chloro-benzenesulfonamido) - 5 - (β - methoxyethyloxy) - 6-chloro-pyrimidine which, when crystallized from ethanol, melted at 147–149°. This compound when treated with ethylene glycol and sodium gave 4-(4'-chloro-benzenesulfonamido) - 5 - (β - methoxyethyloxy) - 6-(β - hydroxyethyloxy)-pyrimidine which had a melting point of 123° when crystallized from ehtanol.

The 4,6-dichloro-5 - (β-methoxyethyloxy) - pyrimidine which was used as starting material was prepared in the following manner:

99 g. of β-methoxyethyloxy-malonic acid dimethyl ester of boiling point 187–190°/18 mm. was stirred for 16 hours at room temperature in 600 ml. of concentrated ammonia. After evaporation in vacuo, there was obtained the diamide which upon crystallizing from ehtanol melted at 154–155°. 43.8 g. of the β-methoxy-ethyloxy-malonic acid diamide obtained in this way was boiled at reflux for 3 hours with 15.7 g. of sodium dissolved in 400 ml. of absolute ethanol and 15.7 g. of formamide. After distilling off 200 ml. of ethanol, the disodium salt of the resulting 4-6-dihydroxy-5-(β-methoxy-ethyloxy)-pyrimidine was filtered hot by suction, dried and heated for 3 hours at 130° bath temperature with 230 ml. of phosphorous oxychloride and 22 ml. of dimethylaniline. The greater part of the phosphorous oxychloride was evaporated off in vacuo, the residue treated with ice-water and the 4.6-dichloro-5-(β-methoxy-ethyloxy)-pyrimidine thus obtained was extracted with methylene chloride. The compound distilled at 98–100°/0.1 mm.

Example 11

12.8 g. of 4,6-dichloro-5-phenyl-2-methoxy-pyrimidine was heated with 25 g. of (p-chloro-benzenesulfonamide)-sodium in 80 ml. of dimethylformamide as in Example 6. The so-obtained 4-(4'-chloro-benzenesulfonamido)-5-phenyl-2-methoxy-6-chloro-pyrimidine, when crystallized from acetonitrile, melted at 190–191°.

By heating with ethylene glycol monoethyl ether and sodium, there was obtained 4-(4'-chloro-benzenesulfonamido) - 5 - phenyl - 2,6-bis-(β-methoxyethyloxy)-pyrimidine which, when crystallized from acetonitrile melted at 137°. Analogously, with ethylene glycol monoethyl ether and sodium, there was obtained 4-(4'-chloro-benzenesulfonamido) - 5 - phenyl-2,6-bis-(β-ethoxyethyloxy)-pyrimidine which, when crystallized from acetonitrile, melted at 133–135°.

*Example 12*

By a procedure analogous to that of Example 5, 22.5 g. of 4,6-dichloro-5-phenyl-pyrimidine was reacted with 48 g. of (p-methyl-thio-benzenesulfonamide)-sodium in 160 ml. of dimethylformamide to give 4-(4′-methylthio-benzenesulfonamido)-5-phenyl-6-chloro-pyrimidine which, when crystallized from acetonitrile, melted at 229–231°.

This compound when treated with ethylene glycol and sodium gave 4-(4′-methylthio-benzenesulfonamido)-5-phenyl-6-($\beta$-hydroxy-ethyloxy)-pyrimidine of melting point 174–176° (from acetonitrile) and when treated with ethylene glycol monoethyl ether and sodium gave 4-(4′-methylthio-benzenesulfonamido)5 - phenyl-6-($\beta$-methoxyethyloxy)-pyrimidine of melting point 145–147° (from acetonitrile).

*Example 13*

By a procedure analogous to that of Example 8, there was prepared from 12.5 g. of 4,6-dichloro-5($\beta$-methoxyethyl)-pyrimidine and 31.5 g. of (p-methylthio-benzenesulfonamide)-sodium in 145 ml. of dimethylformamide the compound 4-(4′-methylthio-benzenesulfonamido)-5-($\beta$-methoxyethyl)-6-chloro-pyrimidine of melting point 145–146° (from acetonitrile).

This compound when treated with ethylene glycol and sodium gave 4-(4′-methylthio-benzenesulfonamido)-5-($\beta$-methoxyethyl)-6-($\beta$-hydroxyethyloxy)-pyrimidine of melting point 105–106° (from acetonitrile).

We claim:

1. 4-(p - toluene - sulfonamido)-5-($\beta$-methoxyethyl)-6-($\beta$-ethoxyethyloxy)-pyrimidine.
2. 4 - (4′ - chloro-benzenesulfonamido)-5-($\beta$-methoxyethyl)-6-($\beta$-ethoxyethyloxy)-pyrimidine.
3. 4 - (p - toluene-sulfonamido)-5-phenyl-6-($\beta$-ethoxyethyloxy)-pyrimidine.
4. 4 - (4′ - chloro-benzenesulfonamido)-5-phenyl-6-($\beta$-ethoxy-ethyloxy)-pyrimidine.
5. 4 - benzenesulfonamido - 5-phenyl-6-($\beta$-ethoxyethyloxy)-pyrimidine.
6. 4 - benzenesulfonamido-5-phenyl-6-($\beta$-methoxyethyloxy)-pyrimidine.
7. 4 - benzenesulfonamido-5-phenyl-6-($\beta$-hydroxyethyloxy)-pyrimidine.
8. 4 - (4′ - chloro-benzenesulfonamido)-5-phenyl-6-($\beta$-methoxyethyloxy)-pyrimidine.
9. 4-(4′-chloro-benzenesulfonamido)-5-phenyl-6-($\beta$-hydroxyethyloxy)-pyrimidine.
10. 4 - benzenesulfonamido - 5-($\beta$-methoxyethyl)-6-($\beta$-methoxyethyloxy)-pyrimidine.
11. 4 - benzenesulfonamido - 5-($\beta$-methoxyethyl)-6-($\beta$-ethoxyethyloxy)-pyrimidine.
12. 4 - (4′ - chloro-benzenesulfonamido)-5-$\beta$-methoxyethyl)-6-($\beta$-hydroxy-ethyloxy)-pyrimidine.
13. 4 - benzenesulfonamido-5-($\beta$-methoxyethyloxy)-6-($\beta$-hydroxy-ethyloxy)-pyrimidine.
14. 4 - (4′-chloro-benzenesulfonamido)-5-($\beta$-methoxyethyloxy)-6-($\beta$-hydroxy-ethyloxy)-pyrimidine.
15. 4 - (4′ - chloro-benzenesulfonamido)-5-phenyl-2,6-bis-($\beta$-methoxyethyloxy)-pyrimidine.
16. 4 - (4′ - chloro-benzenesulfonamido)-5-phenyl-2,6-bis-($\beta$-ethoxyethyloxy)-pyrimidine.
17. 4 - methylthio-benzenesulfonamido)-5-phenyl-6-($\beta$-hydroxyethyloxy)-pyrimidine.
18. 4 - (4′ - methylthio-benzenesulfonamido)-5-phenyl-6-($\beta$-methoxyethyloxy)-pyrimidine.
19. 4 - (4′ - methylthio-benzenesulfonamido)-5-($\beta$-methoxyethyl)-6-($\beta$-hydroxyethyloxy)-pyrimidine.
20. 4-(p-toluene-sulfonamido) - 5 - phenyl - 6 - chloro-pyrimidine.
21. 4 - benzenesulfonamido - 5 - phenyl - 6 - chloropyrimidine.
22. 4-(4′ - chloro-benzenesulfonamido) - 5 - phenyl-6-chloro-pyrimidine.
23. 4 - benzenesulfonamido - 5 - ($\beta$ - methoxyethyl)-6-chloropyrimidine.
24. 4 - (4′ - chloro-benzenesulfonamido) - 5 - ($\beta$-methoxyethyl)-6-chloro-pyrimidine.
25. 4-benzenesulfonamido - 5 - ($\beta$ - methoxyethyloxy)-6-chloro-pyrimidine.
26. 4-(4′-chloro-benzenesulfonamido)-5-($\beta$ - methoxyethyloxy)-6-chloro-pyrimidine.
27. 4-(4′ - chloro-benzenesulfonamido) - 5 - phenyl-2-methoxy-6-chloro-pyrimidine.
28. 4-(4′-methylthio-benzenesulfonamido) - 5 - phenyl-6-chloro-pyrimidine.
29. 4 - (4′ - methylthio-benzenesulfonamido) - 5 - ($\beta$-methoxyethyl)-6-chloro-pyrimidine.
30. 4-(p-$R_4$-benzenesulfonamido) - 5 - (methoxyethyl)-6-($\beta$-ethoxyethyloxy)-pyrimidine wherein $R_4$ represents a member selected from the group consisting of hydrogen, lower alkyl, halogen, lower alkylthio and lower alkoxy.
31. 4-benzenesulfonamido - 5 - phenyl-($\beta$-lower alkoxyethyloxy)-pyrimidine.
32. 4-(4′ - chloro-benzenesulfonamido) - 5 - phenyl-6-($\beta$-lower alkoxyethyloxy)-pyrimidine.
33. 4 - (4′ - chloro-benzenesulfonamido) - 5 - phenyl-2,6-bis-($\beta$-lower alkoxyethyloxy)-pyrimidine.
34. 4-(p-$R_4$-benzenesulfonamido) - 5 - phenyl-6-($\beta$-hydroxyethyloxy)-pyrimidine wherein $R_4$ represents a member selected from the group consisting of hydrogen, lower alkyl, halogen, lower alkylthio and lower alkoxy.
35. 4-(p-$R_4$-benzenesulfonamido) - 5 - phenyl-6-chloropyrimidine wherein $R_4$ represents a member selected from the group consisting of hydrogen, lower alkyl, halogen, lower alkylthio and lower alkoxy.
36. 4-(p - $R_4$ - benzenesulfonamido) - 5 - ($\beta$-methoxyethyloxy)-6-chloro-pyrimidine wherein $R_4$ represents a member selected from the group consisting of hydrogen, lower alkyl, halogen, lower alkylthio and lower alkoxy.
37. A compound of the formula

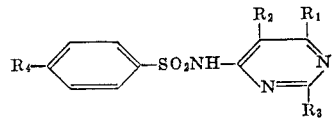

wherein $R_1$ represents a member selected from the group consisting of lower alkoxy-lower alkyloxy and hydroxy-lower alkyloxy; $R_2$ represents a member selected from the group consisting of lower alkyl, saturated carbocyclic rings of 3–7 carbon atoms, lower alkenyl, olefinically unsaturated carbocyclic rings of 3–7 carbon atoms, lower alkoxy, lower alkoxy-lower alkyl, hydroxy-lower alkyl, lower alkoxy-lower alkyloxy, hydroxy-lower alkyloxy, phenyl, phenyl substituted by halogen, hydroxy, lower alkyl, lower alkoxy, hydroxy-lower alkyl or lower alkoxy-lower alkyl, phenyl-lower alkyl and phenyl-lower alkyl in which the phenyl nucleus is substituted by halogen, hydroxy, lower alkyl, lower alkoxy, hydroxy-lower alkyl or lower alkoxy-lower alkyl; $R_3$ represents a member selected from the group consisting of hydrogen, lower alkyl, hydroxy-lower alkyloxy and lower alkoxy-lower alkyloxy; and $R_4$ represents a member selected from the group consisting of hydrogen, halogen, lower alkyl, lower alkylthio and lower alkoxy and pharmaceutically acceptable base addition salts thereof.

38. A compound of the formula

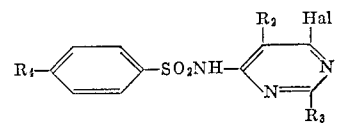

wherein Hal represents a member selected from the group consisting of chlorine and bromine; $R_2$ represents a member selected from the group consisting of lower alkyl, saturated carbocyclic rings of 3–7 carbon atoms, lower alkenyl, olefinically unsaturated carbocyclic rings of 3–7 carbon atoms, lower alkoxy, lower alkoxy-lower alkyl, hydroxy-lower alkyl, lower alkoxy-lower alkyloxy, hydroxy-lower alkyloxy, phenyl, phenyl substituted by halogen, hydroxy, lower alkyl, lower alkoxy, hydroxy-lower alkyl or lower alkoxy-lower alkyl, phenyl-lower alkyl and phenyl-lower alkyl in which the phenyl nucleus is substituted by halogen, hydroxy, lower alkyl, lower alkoxy, hydroxy-lower alkyl or lower alkoxy-lower alkyl; $R_3$ represents a member selected from the group consisting of hydrogen, lower alkyl, hydroxy-lower alkyloxy and lower alkoxy-lower alkyloxy; and $R_4$ represents a member selected from the group consisting of hydrogen, halogen, lower alkyl, lower alkylthio and lower alkoxy.

References Cited by the Examiner

UNITED STATES PATENTS

| 2,506,351 | 5/1950 | English et al. | 260—256.5 |
| 3,082,206 | 3/1963 | Langley | 260—256.5 |
| 3,180,866 | 4/1965 | Horstmann et al. | 260—256.5 |

FOREIGN PATENTS

| 886,692 | 1/1962 | Great Britain. |

OTHER REFERENCES

Davoll, Jour. Chem. Soc., 1960, pp. 131–138.

Gutsche et al.: Arzneimittel-Forchung, May 1964, pp. 373–376.

ALEX MAZEL, *Primary Examiner.*

MARY O'BRIEN, *Assistant Examiner.*